United States Patent [19]

Ashjaee et al.

[11] Patent Number: 4,928,106

[45] Date of Patent: May 22, 1990

[54] GLOBAL POSITIONING SYSTEM RECEIVER WITH IMPROVED RADIO FREQUENCY AND DIGITAL PROCESSING

[75] Inventors: Javad Ashjaee, San Jose; Roger J. Helkey, Goleta; Robert G. Lorenz, Palo Alto; Robert A. Sutherland, Newark, all of Calif.

[73] Assignee: Ashtech Telesis, Inc., Sunnyvale, Calif.

[21] Appl. No.: 219,353

[22] Filed: Jul. 14, 1988

[51] Int. Cl.$^5$ .............................................. H04B 7/185
[52] U.S. Cl. .................................................... 342/352
[58] Field of Search ........................ 342/352, 356, 357

[56] References Cited

U.S. PATENT DOCUMENTS

| 4,426,712 | 0/1984 | Gorski-Popiel . | |
|---|---|---|---|
| 4,445,118 | 4/1984 | Taylor et al. | 342/357 |
| 4,797,677 | 1/1989 | MacDoran et al. | 342/352 |

FOREIGN PATENT DOCUMENTS 0166911 of 1986 European Pat. Off. .

OTHER PUBLICATIONS

Rockwell International Corporation, "Interface Control Document—Navstar GPS Space Segment/Navigation User Interfaces", Sept. 26, 1984 (code identification No. 03953), as revised Dec. 19, 1986 (code identification No. 64355).
P. Ward, "An Advanced NAVSTAR GPS Multiplex Receiver", *IEEE Position Location and Navigation Symposium,* Atlantic City, N.J., Dec. 9, 1980, pp. 51–58.
P. K. Blair, "Receivers for the NAVSTAR Global Positioning System", *IEEE Proc.,* vol. 127, Pt. F, No. 2, Apr., 1980, pp. 163–167.
K. P. Yiu et al., "Land Navigation with a Low Cost GPS Receiver", *IEEE National Telecommunication Conference,* Nov. 30–Dec. 4, 1980.
K. P. Yiu et al., "A Low-Cost GPS Receiver for Land Navigation", Navigation, Vol. 29, No. 3, Fall, 1982, pp. 204–220.
J. W. Murphy et al., "Collins Avionics NAVSTAR GPS Advanced Digital Receiver", *Inst. of Navigation's 1983 National Aerospace Meeting,* Mar. 22–25, 1983, pp. 107–116.
R. McLean and Q. D. Hua, "An Advanced Microprocessor-Controlled GPS Time Transfer System", Inst. of Navigation's 1983 National Aerospace Meeting, Mar. 22–25, 1983, pp. 142–148.
E. D. Holm, "A GPS Fast Acquisition Receiver", *IEEE National Tele—Systems Conference, Nov. 14–16, 1983, pp. 214–218.*

Primary Examiner—Theodore M. Blum
Attorney, Agent, or Firm—Majestic, Parsons, Siebert & Hsue

[57] ABSTRACT

A global positioning system (GPS) receiver having a common radio frequency section and a separate digital signal processing channel for each of a plurality of satellite signals which are simultaneously being received and processed by the receiver in order to calculate the position, velocity or other desired parameters of the receiver. The radio frequency section receives and processes both of the standard satellite signals on different frequency L1 and L2 carriers in order to provide the multi-channel digital section signals from which the relative phase of the carriers from each of the plurality of satellites may be determined. Particular mutually coherent local oscillator and digital clock frequencies are selected in order to minimize the complexity of the receiver without creating any undesired side effects. A high resolution relative phase measurement is made in each digital section by averaging the number of phase shifting pulses over a period of time that are generated by a phase locked loop that is locked onto an L-band carrier frequency, that average incremental phase being added to a base phase measurement obtained simultaneously in each of the digital processing channels.

15 Claims, 6 Drawing Sheets

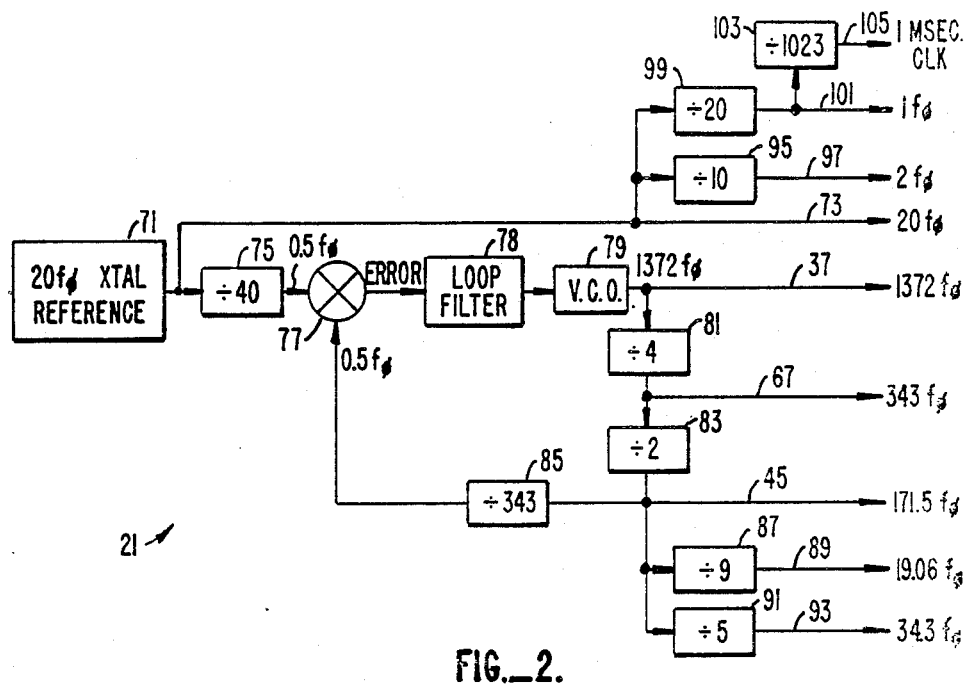
FIG._2.
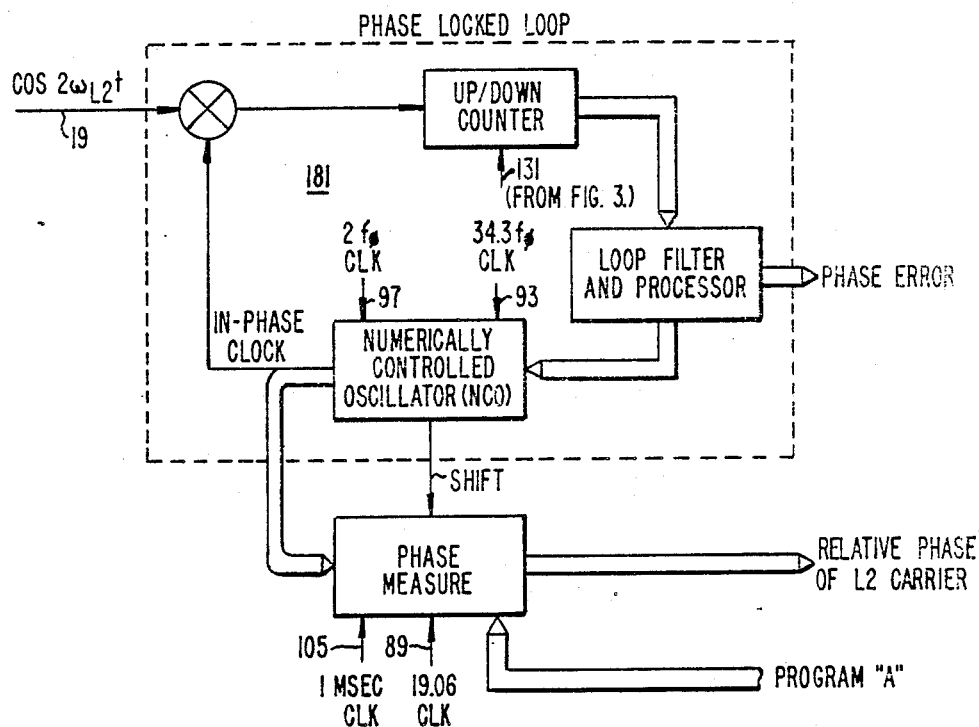
FIG._4.

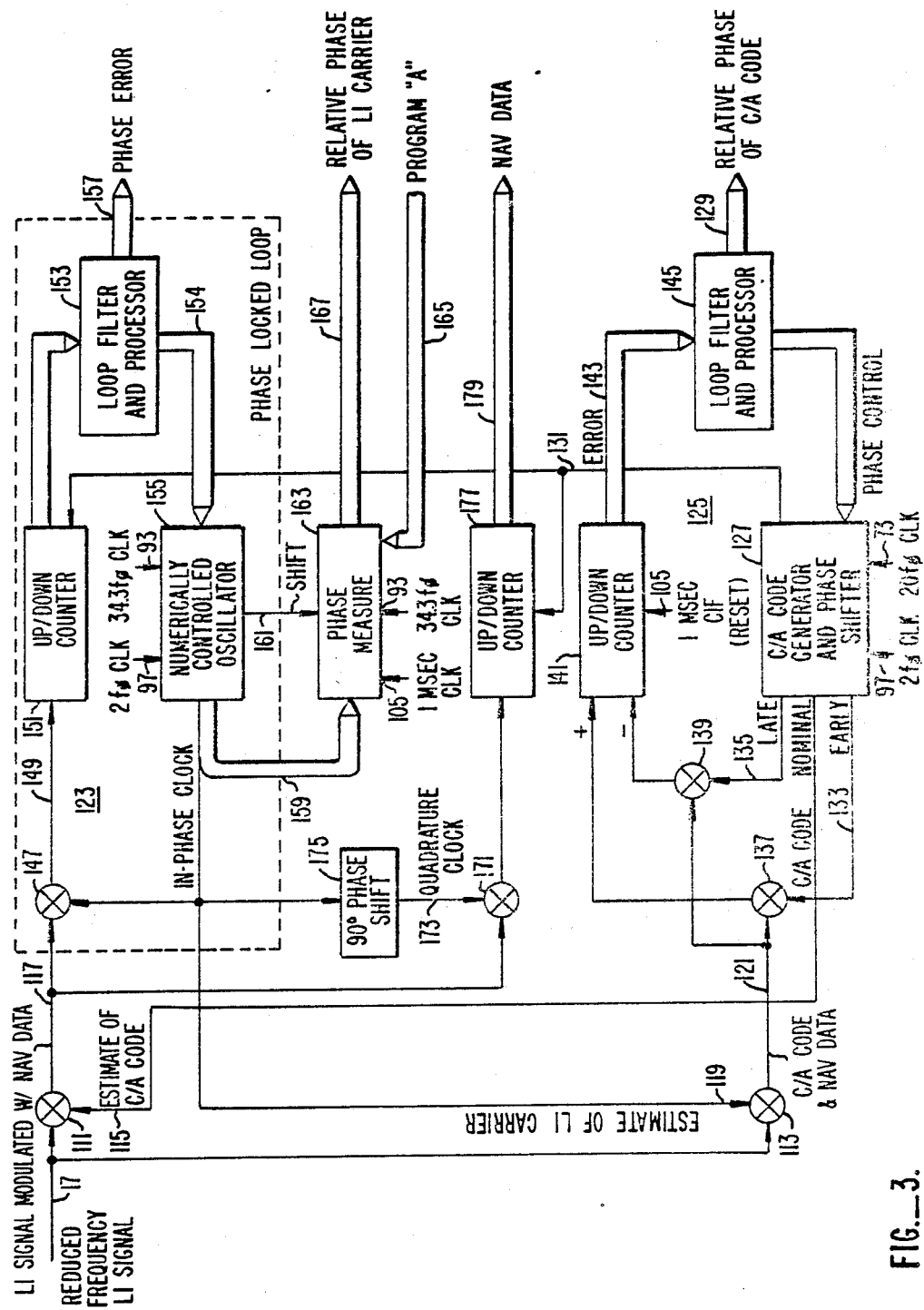
FIG._3.

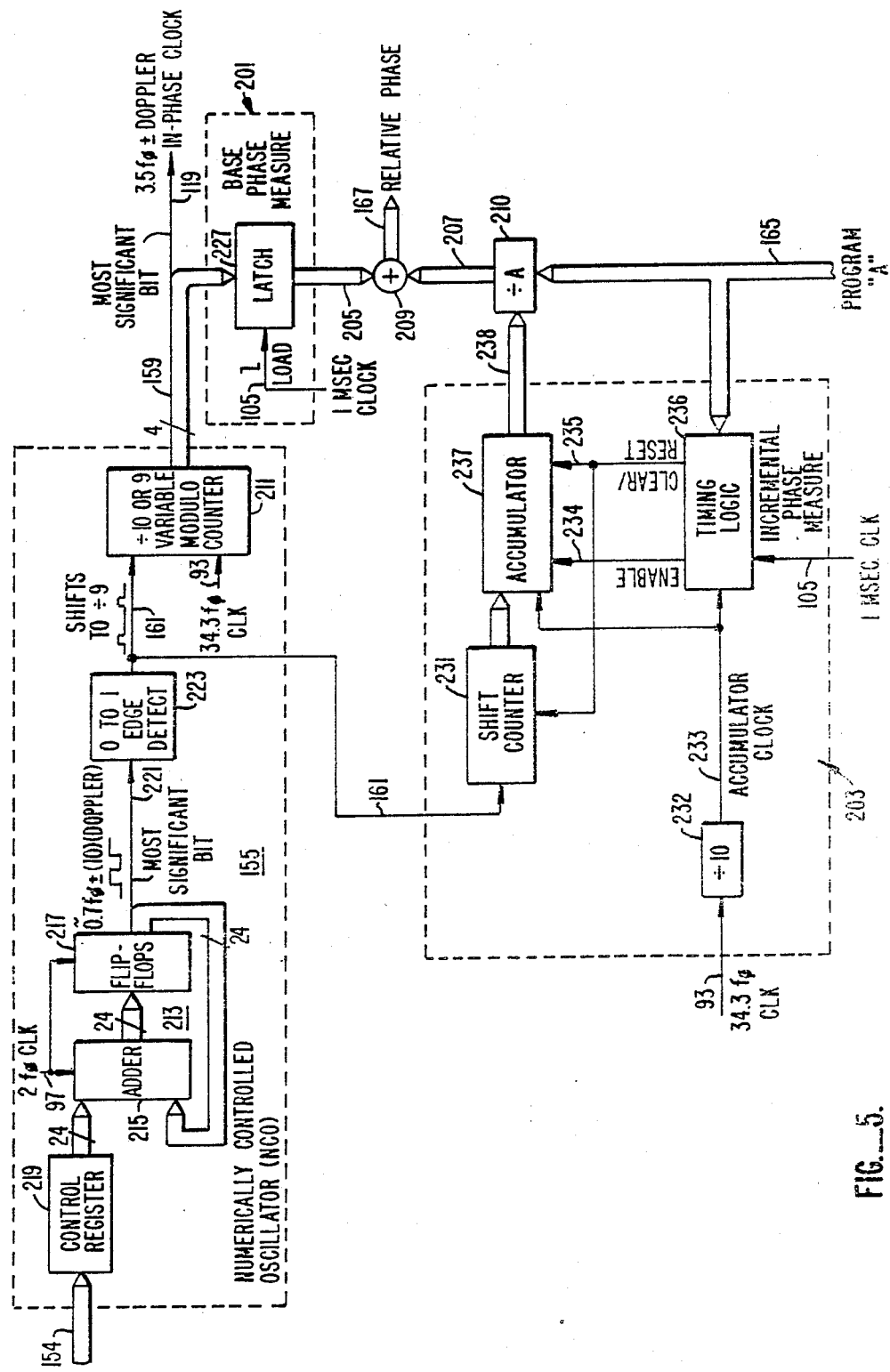
FIG._5.

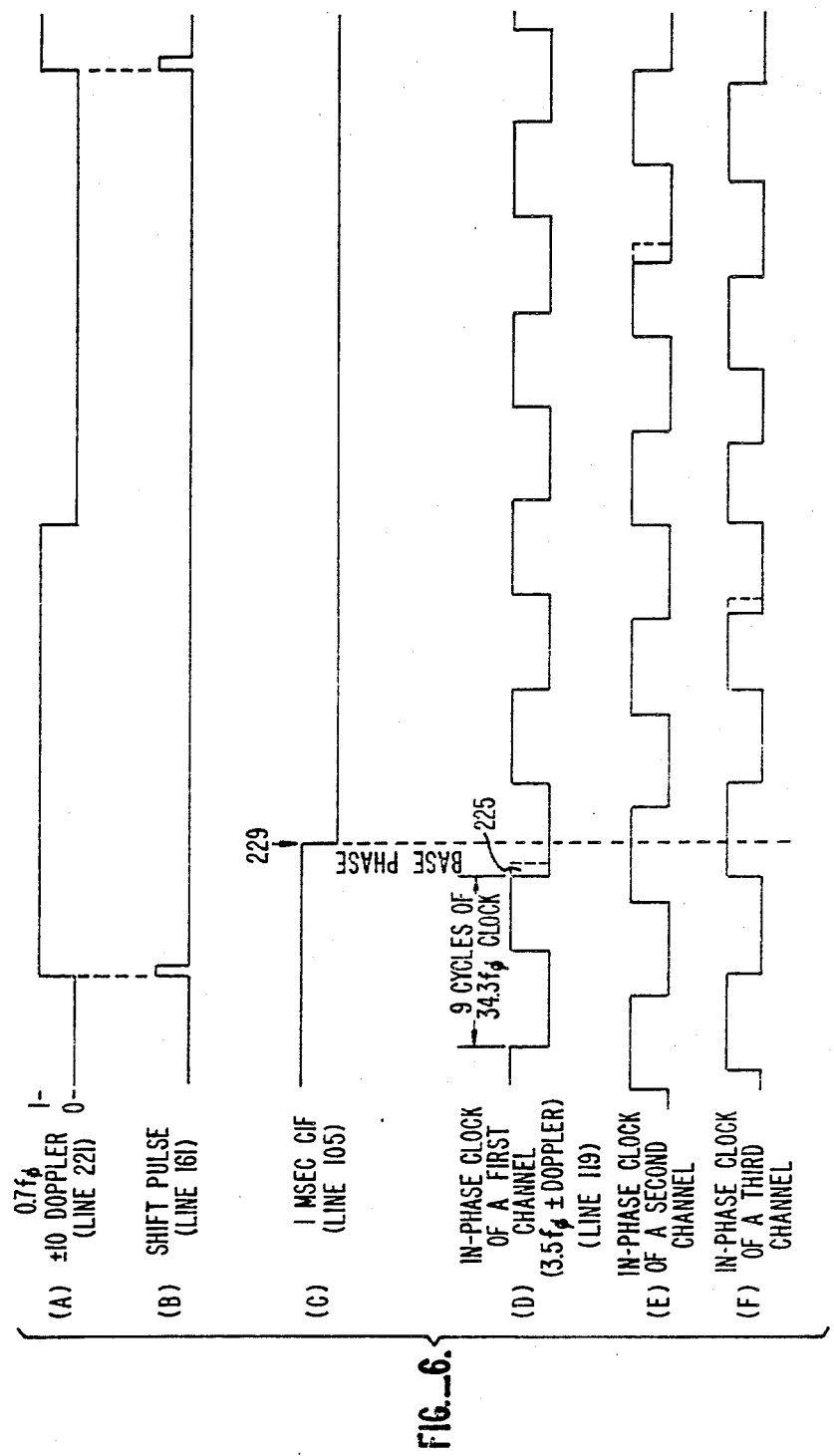

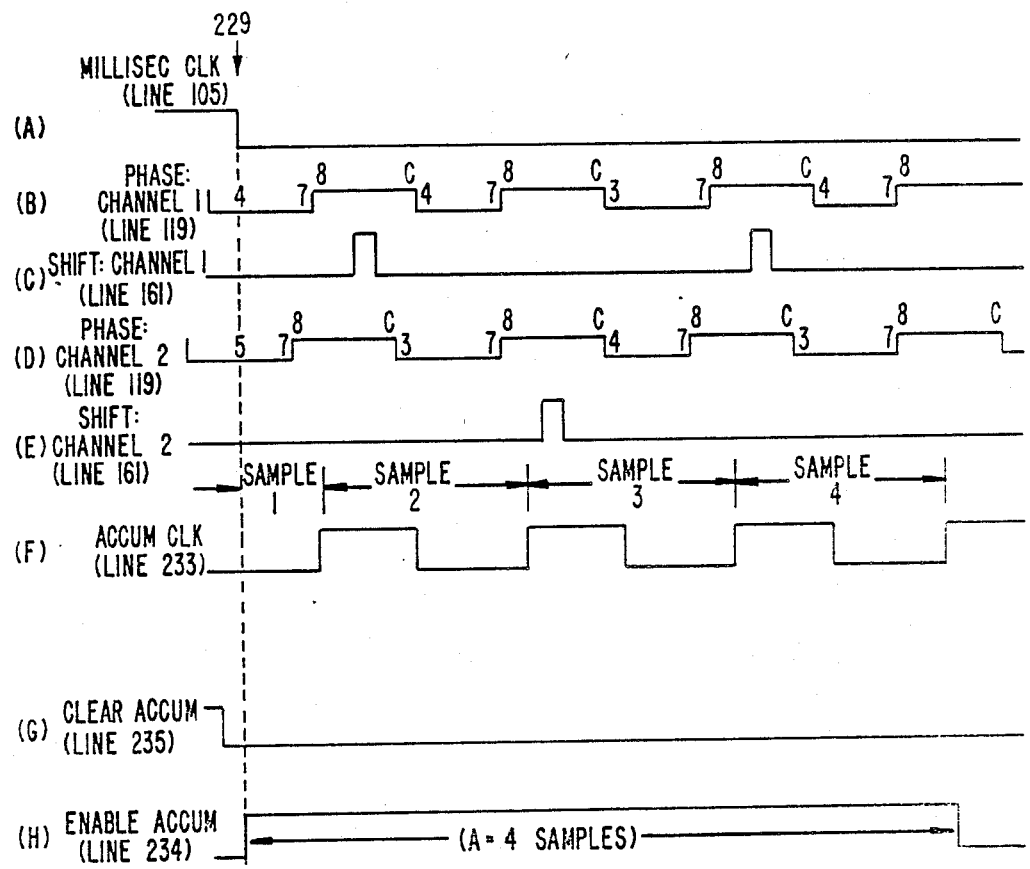

GLOBAL POSITIONING SYSTEM RECEIVER WITH IMPROVED RADIO FREQUENCY AND DIGITAL PROCESSING

BACKGROUND OF THE INVENTION

This invention relates generally to global positioning system satellite signal receivers, and more particularly to an overall architecture thereof and to specific improvements in radio frequency and digital processing receiver sections.

The United States government is in the process of placing into orbit a number of satellites as part of a global positioning system (GPS). Some of the satellites are already in place. A receiver of signals from several such satellites can determine very accurately parameters such position, velocity, and time. There are both military and commercial uses. A primary military use is for a receiver in an aircraft or ship to constantly determine the position and velocity of the plane or ship. An example commercial use includes accurate determination of the location of a fixed point or a distance between two fixed points, with a high degree of accuracy. Another example is the generation of a high accuracy timing reference.

In order to accomplish this, each satellite continually transmits two L-band signals. A receiver simultaneously detects the signals from several satellites and processes them to extract information from the signals in order to calculate the desired parameters such as position, velocity or time. The United States government has adopted standards for these satellite transmissions so that others may utilize the satellite signals by building receivers for specific purposes. The satellite transmission standards are discussed in many technical articles and are set forth in detail by an "Interface Control Document" of Rockwell International Corporation, entitled "Navstar GPS Space Segment/Navigation User Interfaces", dated Sept. 26, 1984, as revised Dec. 19, 1986.

Briefly, each satellite transmits an L1 signal on a 1575.42 MHz carrier, usually expressed as $1540f_0$, where $f_0 = 1.023$ MHz. A second L2 signal transmitted by each satellite has a carrier frequency of 1227.6 MHz, or $1200f_0$.

Each of these signals is modulate in the satellite by at least one pseudo-random signal function that is unique to that satellite. This results in developing a spread spectrum signal that resists the effects of radio frequency noise or intentional jamming. It also allows the L-band signals from a number of satellites to be individually identified and separated in a receiver. One such pseudo-random function is a precision code ("P-code") that modulates both of the L1 and L2 carriers in the satellite. The P-code has a 10.23 MHz clock rate and thus causes the L1 and L2 signals to have a 20.46 MHz bandwidth. The P-code is seven days in length. In addition, the L1 signal of each satellite is modulated by a second pseudo-random function, a unique clear acquisition code ("C/A-code") having a 1.023 MHz clock rate and repeating its pattern every one millisecond, thus containing 1023 bits. Further, the L1 carrier is also modulated by a 50 bit-per-second navigational data stream that provides certain information of satellite identification, status and the like.

In a receiver, signals corresponding to the known pseudo-random functions are generated and aligned in phase with those modulated onto the satellite signals in the process of demodulating those signals. The phase of the carriers from each satellite being tracked is measured from the results of correlating each satellite signal with a locally generated pseudo-random function. The relative phase of carrier signals from a number of satellites is a measurement that is used by a receiver to calculate the desired end quantities of distance, velocity, time, etc. Since the P-code functions are to be classified by the United States government so that they can be used for military purposes only, commercial users of the global positioning system must work only with the C/A-code pseudo-random function.

It is an object of the present invention to provide a global positioning receiver architecture that allows a reliable, low cost, low power consumption, simple receiver structure.

It is another object of the present invention to provide a receiver system that measures the relative phase of a number of satellite signals to a higher degree of accuracy than now possible, thus improving the accuracy of the ultimate quantities, such as position, velocity, and time, that are determined from those relative phase measurements.

SUMMARY OF THE INVENTION

These and additional objects are accomplished by the various aspects of the present invention which include an overall receiver architecture and improvements in individual portions of the receiver system. The receiver is formed in two major sections. The first is a radio frequency section that simultaneously receives the L-band signals from a plurality of satellites and develops low intermediate frequency signals within the capability of readily available digital circuits. The second is a digital processing section which receives the intermediate frequency signals, correlates them with the C/A-code of each satellite whose signals are being processed, and provides measurements of the relative phase of each signal. Correlation with (demodulation by) the C/A-code pseudo random function is accomplished in the digital section, not in the radio frequency section of the receiver. The relative phase and other measurements are then used by a processor to calculate the desired end quantities such as position, distance, velocity, time, and the like. All clocks and timing signals used by both the radio frequency and digital processing sections of the receiver are mutually coherent, being derived from a common oscillator. A particular combination of demodulating frequencies has been found that, in addition to providing an intermediate frequency that may be processed digitally, keeps the amount and complexity of circuitry low without creating additional problems.

The radio frequency section includes two serially connected frequency down-converter stages for reducing the L1 signal in frequency to something close to twice the bandwidth of the C/A-code pseudo-random function. The resulting low frequency signal is more easily processed by the digital section of the receiver.

The radio frequency section optionally includes circuits for reducing the frequency of the L2 signal, including two serial down-converter stages and an auto-correlation (squaring) stage to provide a low frequency signal for the digital processing circuits. The modulated information on the L2 carrier will not be available to commercial users of the global positioning system so it need not be preserved in the signal. The frequency and phase of the intermediate frequency L2 carrier can then be used by the digital section in combination with that of the reduced frequency L1 carrier to determine the effect of the ionosphere on the carrier frequency and phase measurements in order that the unknown effect of the ionosphere on the measurements may be determined.

The digital section receives the reduced frequency L1 signals. The L1 signal for each satellite is processed by a separate digital circuit channel. Each channel generates a replica of the L1 carrier signal received from it's satellite. The relative phases of the replica L1 carrier signals for the satellites are measured at a common instant, to the resolution of the highest practical clock frequency. These become base phase measurements. In order to increase the accuracy and resolution of the relative phase measurements, the phase of each replica L1 carrier signal is additionally monitored for a large number of cycles after the base phase measurements. An average incremental phase over these cycles for each channel is then added to its base phase measurement in order to obtain a relative phase of that channel's L1 carrier signal to a higher resolution than is possible by measuring the base phase alone. This then allows the ultimate quantities (position, distance, velocity, time, etc.) that are calculated with the use of the relative L1 signal carrier phases to be obtained with greater accuracy.

Each digital channel generates from memory a replica of the C/A-code of its satellite L1 signal, since each such satellite code is known. Its phase is adjusted to match that in the received L1 signal by a phase adjusting circuit. The relative phase of the C/A-code is part of the information that may be used to make the desired end calculations of distance, velocity, time and the like. But the in-phase C/A-code is also used to demodulate the L1 signal in each channel in order to obtain the replica of its L1 signal carrier that is used to make the phase measurements described above.

In a preferred form of the invention, this L1 carrier replica is obtained by locking onto it by a loop that includes a numerically controlled oscillator (NCO). The NCO includes a variable modulo counter and a circuit that generates periodic shift pulses to keep the counter in-phase with the L1 signal carrier. The modulo of the counter changes each time it receives a shift pulse. The base relative phase of each L1 carrier signal is determined at the common instant by reading the outputs of the respective digital processing channels' counters. The finer resolution phase measurement discussed above is obtained by counting and averaging the number of shift pulses in the NCO counter that occur during a predetermined period after the instant of base phase measurement. This is a simple, straight forward method of carrying out the high resolution L1 signal carrier phase measurements discussed above.

Additional objects, advantages and features of the various aspects of the present invention will become apparent from the following description of a preferred embodiment thereof, which description should be taken in conjunction with the accompanying drawings.

BRIEF DESCRIPTION OF THE DRAWINGS

FIG. 2 illustrates the clock and timing circuits of the system of FIG. 1;

FIG. 3 is a circuit for processing the L1 carrier signal in one of the digital processing channels of the system of FIG. 1;

FIG. 4 is a circuit for processing the L2 signal in one of the digital processing channels of the receiver of FIG. 1;

FIG. 5 is a more detailed representation of the numerically controlled oscillator and phase measurement circuits of the digital processing circuits shown in FIGS. 3 and 4;

FIGS. 6(A) through 6(F) are waveforms that generally illustrate the operation of the circuits of FIG. 5;

FIGS. 7(A) through 7(H) are waveforms that show a specific example of the operation of the circuits of FIG. 5; and FIGS. 8(A) and 8(B) are tables that further illustrate that example of the operation of the circuits of FIG. 5.

DESCRIPTION OF A PREFERRED EMBODIMENT

Figure 1:
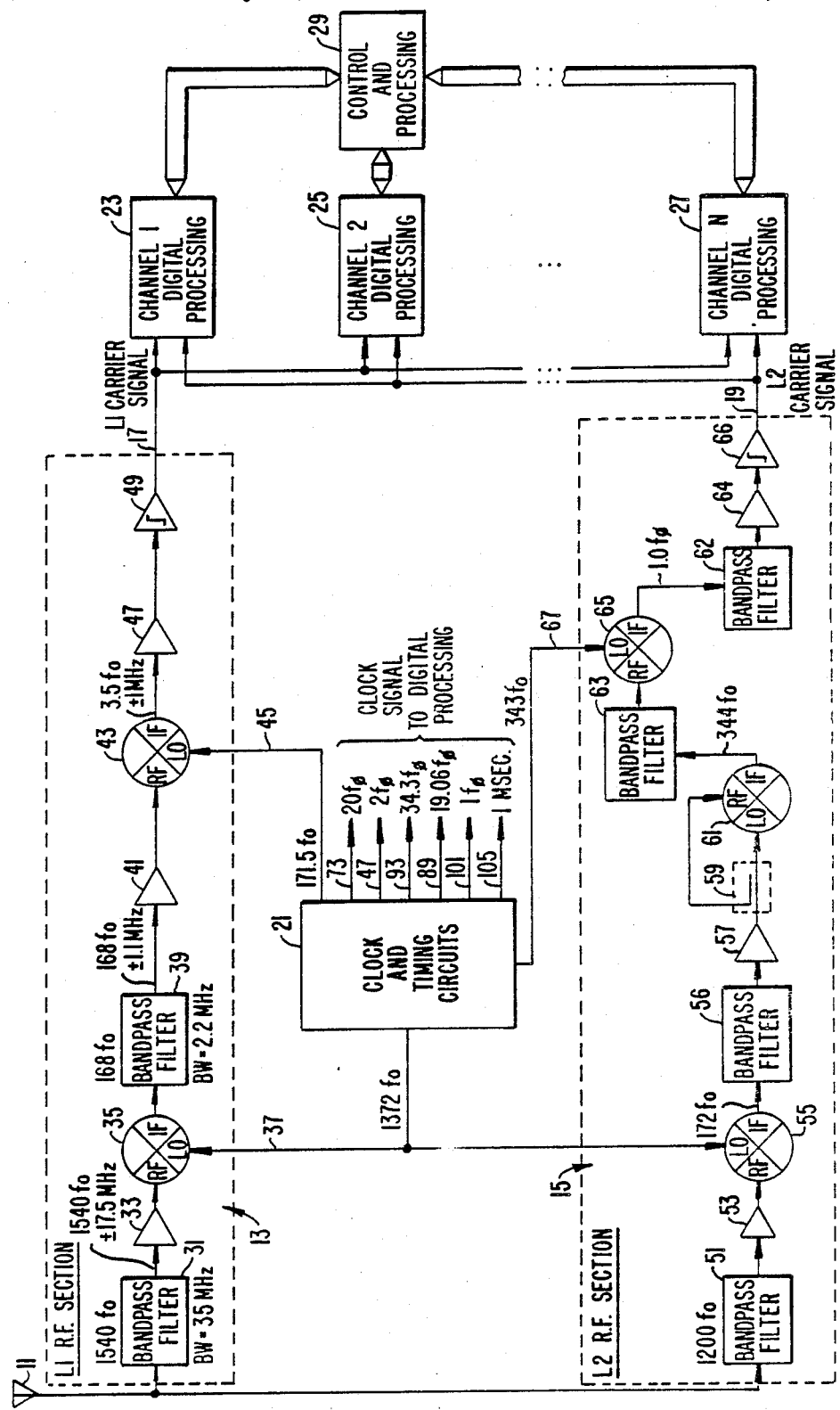
FIG. 1 schematically illustrates the architecture of a receiver embodying the improvements of the present invention, including the radio frequency section circuits.

Referring initially to FIG. 1, an overall receiver system is described. The receiver has provisions for connection to an appropriate antenna 11. The signals from the antenna 11 are simultaneously applied to two portions of a radio frequency section, one portion 13 for reducing the frequency bands of the several L1 signals present, and a portion 15 for reducing the frequency bands of the several L2 signals present. An output 17 of the L1 portion 13, in this particular example, is a signal having a frequency of $3.5f_0$ ($f_0 = 1.023$ MHz), with a bandwidth of $2f_0$, the C/A-code pseudo random noise that is modulated onto the L1 carrier by each of the satellites being monitored. An output 19 of the L2 radio frequency section 15 is, in this specific example, a $1f_0$ signal with practically all modulated information removed, so has a narrow bandwidth. Both of the portions 13 and 15 of the radio frequency section receive local oscillator signals from a common timing circuit 21.

Each of the L1 intermediate frequency signal in line 17 and the L2 intermediate frequency signal in line 19 is applied to each of a plurality of individual digital processing channels 23, 25, and 27. It is necessary to simultaneously process signals from several satellites, and depending upon the particular information to be derived, usually needs to monitor signals from four or more satellites. It is preferable, however, that a number of digital processing channels be provided that is equal to the maximum number of satellites whose signals may be simultaneously monitored and processed by the receiver when applied to its intended use. Control and processing circuits 29 control the operation of the digital processing channels 23-27 and receive the measured phase, frequency, and code phase outputs of each channel for calculating the ultimate quantity of distance, velocity or the like depending upon the receiver's intended applications.

In the specific receiver example being described, the desired measurement and calculations may be made without the L2 portion 15 of the radio frequency section, thereby eliminating the reduced frequency L2 carrier signal in the line 19 from all of the digital processing channels 23-27. The primary purpose of using the L2 carrier signal is to provide a reference for eliminating from the L1 carrier signal measured quantities the effect of the ionosphere.

A preferred type of antenna 11 is in the form of an omni-directional one and is generally a microstrip patch. Signals received from the satellites are right circular polarized, so the optimal antenna efficiently reconstructs a signal of that polarization while rejecting the cross-polarization that results from reflected signals.

The L1 radio frequency section portion 13 includes two down-converters. A bandpass filter 31 receives the signals from the antenna 11 and is centered to pass the L1 carrier frequency of $1540f_0$. The bandwidth of the filter 31 is made to be greater than the $2f_0$ MHz bandwidth of the C/A code in the L1 signal, typically a bandwidth of 35 MHz. The filter 31 strongly suppresses the L2 and other signals outside its bandpass, including a band of image frequencies near the L2 band. The filter output is applied to a radio frequency amplifier 33 that is selected to have high gain but yet low noise, one made of gallium arsenide components being found preferable. The output of that amplifier is applied to a first mixer 35 which also receives a local oscillator frequency of $1372f_0$ in a line 37. The mixer 35 is preferably a commercially available double-balanced mixer.

The signal output of the mixer 35 is then applied to another bandpass filter 39. The filter 39 has a center of its bandpass at $168f_0$, the difference between the two frequencies applied to the mixer 35. The sum of those frequencies, which is also included in the output of the mixer 35, is rejected by the filter 39. The bandwidth of the filter 39 is approximately 2.2 MHz, slightly greater than that of the spectrum of the C/A-code. The filter 39 is preferably a surface acoustic wave (SAW) type.

The band limited signal output of the filter 39 is then amplified by a monolithic silicon amplifier 41. That amplifier's output is then applied to a second mixer 43 which receives a local oscillator signal having a frequency of $171.5f_0$ from the timing circuits 21 in a line 45. The difference frequency of about $3.5f_0$ output of the mixer 41 is then amplified by a commercially available high gain amplifier 47 operating in a non-linear, saturated region. The amplifier 47 limits the level of the signal to components to which its output is connected, in order to avoid overdriving them. Only the phase of the signal must be preserved by the components in the radio frequency section, so clipping of the signal's amplitude is of no concern. Finally, the output of the amplifier 47 is applied to a comparator 49 which translates that amplifier output to digital logic levels in line 17 for use by the digital processing channels 23-27.

The L2 radio frequency section portion 15 connects the signal from the antenna 11 to a bandpass filter 51 having a center bandpass frequency of $1200f_0$, the L2 carrier frequency. An amplifier 53 applies an amplified version of that band limited signal to a first mixer 55. The mixer 55 receives the same local oscillator signal from line 37 that does the first mixer 35 of the L1 radio frequency section portion 13, thereby reducing the complexity of the circuit that would result if a different local oscillator frequencies were used. The frequency of that local oscillator, namely $1372f_0$, is chosen to be intermediate of the carrier frequencies of the L1 and L2 signals.

An output of the first mixer 55 is applied to a bandpass filter centered at $172f_0$, which passes the difference frequency output of the mixer 55. The filter signal is then amplified by amplifier 57 which passes the difference frequency output of the mixer 55, that frequency being $172f_0$. The output of the amplifier 57 is applied to an autocorrelator, made up of coupler 59 and a mixer 61. The mixer 61 receives as its radio frequency and local oscillator signals the same L2 signal from the output of the amplifier 57. The result is an output signal, then applied to a bandpass filter 63, that has doubled in frequency, namely to $344f_0$, but which has its spread spectrum collapsed into a narrow bandwidth signal. The autocorrelation results in all of the modulating information in the satellite being eliminated from the signal so that L2 carrier frequency and relative phase can be measured. The modulating information is the P-code pseudo-random function and data that is to be militarily classified, and the autocorrelation simply eliminates the effect of this unknown modulating signal from the signal being examined by the receiver.

An output of the bandpass filter 63 is applied to a second down-converter mixer 65 that also receives a local oscillator signal in a line 67 that is $343f_0$. Therefore, an output of the mixer 65 is a difference signal of $1f_0$. This difference signal is applied to a bandpass filter 62 which has a center frequency of $1f_0$. The filtered signal is amplified by amplifier 64 and converted to a digital signal in a comparator 66 which translates the amplifier output to digital levels for use by the amplifier processing channels 23-27.

The clock and timing circuits 21 of the receiver of FIG. 1 are shown in more detail in FIG. 2. All of the local oscillator, clock signals and timing signals of the receiver are developed from the output of a very stable oscillator 71. The oscillator 71 preferably includes an oven temperature controlled crystal so that the output frequency is very precise and stable. In the particular receiver example being described herein, that output is chosen to have a frequency of $20f_0$, which is connected directly to one of the timing circuit output lines 73 for utilization by the digital circuits.

The output of the oscillator 71 is passed through a dividing circuit 75 and then to a phase locked loop including a phase detector 77, a loop filter 78, a voltage controlled oscillator 79, and dividing circuits 81, 83 and 85, all in a series loop. In order to obtain the specific frequencies desired for the receiver of this example, the circuit 75 divides the oscillator 71 output by 40 and the voltage controlled oscillator has a frequency output of $1372f_0$ when zero voltage is applied to the loop filter 78. The $1372f_0$ output is that which is applied by line 37 to mixers 35 and 55 of the receiver of FIG. 1. That signal is then divided by 4 by the circuit 81, resulting in producing the local oscillator signal $343f_0$ in line 67 that is applied to the mixer 65 of the receiver of FIG. 1. The circuit 83 divides that frequency by 2, resulting in the local oscillator frequency $171.5f_0$ in a line 45 that is applied to the mixer 43 of the receiver of FIG. 1. To close the loop, the circuit 85 divides that signal by 343 before applying it to the phase detector 77.

Additional frequencies are derived in the timing circuit of FIG. 2 from these basic signals and are used in the digital processing circuits in the receiver of FIG. 1. A divide-by-nine circuit 87 produces a $19.05f_0$ signal in a line 89, and a divide-by-five circuit 91 produces a $34.3f_0$ clock signal in a line 93, both of the circuits 87 and 91 receiving the $171.5f_0$ signal from the line 45. In order to produce clock signals at much lower frequency, a divide-by-ten circuit 95 is connected to the $20f_0$ clock signal in line 73 in order to generate in line 97 a $2f_0$ clock. Similarly, a divide-by-20 circuit 99 produces a $1f_0$ clock in a line 101. That clock is further divided by 1023 by a dividing circuit 103, thereby producing in a line 105 a clock signal having a period of 1 millisecond.

Referring to FIG. 3, a portion of the digital processing circuits included in each of the channel processors 23-27 is given. This is the portion of each of those circuits that processes the reduced frequency L1 signal in the line 17 for only one of several satellites whose signals are simultaneously being received and processed. A primary purpose of these circuits is to provide signals from which the ultimate quantities of distance, position, velocity, time, and the like may be calculated. This includes signals proportional to the relative phase of the L1 carrier and to the C/A code.

The incoming signal in the line 17 is applied to a pair of digital mixers 111 and 113. The L1 signal is demodulated by a locally generated estimate of the C/A-code in line 115 for the one satellite whose signals are being processed by the circuit of FIG. 3. An output of the digital mixer 111 in line 117 is then the reduced frequency L1 signal modulated only with the navigation (NAV) data and noise. A demodulating signal applied to the digital mixer 113 in a line 119 is a locally generated estimate of the reduced frequency L1 carrier component of the signal in line 17 for this particular satellite. An output of the mixer 113, in a line 121, is the C/A-code modulated with NAV data of the one satellite, plus noise.

A phase locked loop circuit 123 has as a principal purpose to lock onto the L1 carrier for a single satellite that has been separated from all of the satellite L1 signals into line 117. Each satellite's L1 signal will have a frequency that varies within a small range of frequencies about $1540f_0$, depending upon the velocity of the satellite relative to the receiver, in accordance with the Doppler effect. Since the C/A code is unique for each satellite, the circuit 123 locks upon the L1 frequency of the satellite whose C/A code is being generated by a receiver circuit 127. One output of the phase lock loop 123 is a replica of that L1 carrier signal, in the line 119. A second principal portion of the circuit of FIG. 3 is an early-late tracking loop 125 that has as a purpose the generation of an estimate of the C/A-code in a line 115 that has the same information content and is of the same phase as that in the L1 signal being received for the one satellite.

The early-late tracking loop 125 is of a type that is well-known in spread spectrum satellite communications technology. The known C/A-code for the one satellite is generated by the circuit 127. The C/A-code generated in each of the digital processing channels 23-27 will be different, and unique to each satellite being used. The known pseudo-random bit pattern, repeating every one millisecond, is known but its relative phase is not. Therefore, the purpose of the circuit 125 is to shift the phase of the locally generated C/A-code in order to produce in the line 115 a code that is in synchronism with the L1 signal that is modulated by that unique C/A-code. The early-late tracking loop 125 also has a purpose of measuring that relative phase shift and producing, for use by the control and processing circuits 29, a signal in lines 129 that is proportional to that phase shift. This quantity is important information that is used by the processor in order to calculate the ultimate quantities of position, velocity, and the like.

The loop 125 includes a phase shifting circuit as part of circuit 127 that forms in a line 133 an advanced phase version of the C/A-code and forms in the line 135 a phase delayed version of that code. These signals are applied, respectively, to digital mixers 137 and 139 for correllating with the signal in the line 121. The outputs of those mixers are applied to an up/down counter 141 which has as an output 143 a signal proportional to an error resulting when the advanced and delayed C/A-code in lines 133 and 135, respectively, are not equally displaced in phase on either side of the C/A-code in line 121 that is contained in the signal being processed. When there is such an error, that is passed through a filter 145 to the phase shifter in the circuit 127 which makes an adjustment in order to reduce the error to zero. That adjustment results in the C/A-code of the generator in the circuit 127 being shifted in phase on the line 115 to match that of the C/A-code of the L1 signal being processed.

Similarly, the phase lock loop 123 is well known in satellite communication systems for locking onto a carrier signal. This carrier signal is applied to a phase detector 147 which produces as an output in a line 149 any difference in the phase of the signal in line 117 and that in a line 119. An up/down counter 151 receives the signal in line 149 and serves to integrate it over the period of the C/A code. A line 131 carries a signal at the occurrence of a particular state of the locally generated nominal C/A code. This will occur nominally at a one millisecond rate, modified by any phase shift caused by any Doppler effect and local oscillator offset. The integration of the signal in line 149 in synchronism with data transitions assures that no data transition occurs during the integration period. An output of the counter 151 is proportional to the phase of the L1 carrier, and that is applied through a loop filter and processor 153 to a numerically controlled oscillator ("NCO") 155. A signal in line 157 is proportional to the phase error between the L1 carrier and the locally generated estimate of the carrier. It is available for use by the control and processing circuits 29.

The NCO 155 has an output in lines 159 from which the relative phase of the L1 carrier may be measured. That signal, and a shift pulse signal in a line 161 from the NCO 155, are applied to phase measuring circuits 163. Circuits 163 are responsive to various clocks and a control signal in lines 165. A resulting signal in lines 167 is proportional to the phase of the L1 carrier from the one satellite whose signals are being processed by the one processing channel, relative to the phase of L1 carriers from other satellites that are being processed in other of the digital processing channels 23-27.

Although the frequency of the L1 carrier generated by each satellite is very stable, the signal received will be affected by any relative movement between the satellite and the receiver, according to the Doppler effect. Particularly, in a land based receiver, the frequency and relative phase of the L1 carrier from a particular satellite will vary as that satellite moves across the portion of space that is visible to the receiver.

In order to extract navigational (NAV) data being transmitted by this particular satellite, the signal in line 117 is applied to a mixer 171 that receives as a demodulating signal in a line 173 the estimate of the L1 carrier in line 119 after having been shifted ninety degrees in phase by a circuit 175. The resulting demodulated signal is applied to an up/down counter 177 whose output in circuits 179 is the desired navigational data of the one satellite.

In those receivers where the L2 carrier is also processed, each of the digital processing channels 23-27 may contain processing circuitry illustrated in FIG. 4. A phase locked loop 181 is provided that is of the same basic design as the loop 123 of FIG. 3. It also has the same general function, except that it is operating with respect to the L2 carrier instead of the L1 carrier. Since the autocorrelated (squared) L2 carrier contains no navigational data, the circuit of FIG. 4 does not include provisions for dealing with navigational data. Similarly, squaring the L2 signal removes the pseudo-random signal. As a result, there is no local generation and relative phase shift of such a modulating signal in the circuit of FIG. 4 as there is with the C/A-code in the circuit of FIG. 3. In order to lock the phase locked loop 181 on the L2 carrier of the one satellite of interest, the control and processing circuits 29 calculate the Doppler frequency shift for that satellite from its L1 signal, scale that frequency shift for the different L2 frequency, multiply by two, add it to the nominal L2 frequency and then start the numerically controlled oscillator of the loop 181 at that calculated L2 frequency. Once locked on that frequency, the loop 181 will follow its frequency changes as the satellite moves across the sky.

An important part of the receiver being described is the ability to measure relative phase of the L1 carrier to a very high degree of accuracy and resolution. This is accomplished by the phase measuring circuits 163 of FIG. 3. Details of the phase measuring circuits 163 are given in FIG. 5, as well as their interaction with the numerically controlled oscillator 155. The phase measuring circuits 163 include a base phase measuring circuit 201 and an incremental phase measuring circuit 203. An output 238 of the circuit 203 is divided by a programmed dividing circuit 210. The divided output 207 is then combined with the base phase output 205 of the circuit 201 by an adder 209 in order to provide a single relative phase value in lines 167. The dividing and adding functions of elements 209 and 210 can alternately be performed by software in the processing circuits 29.

In order to understand the operation of the phase measuring circuits of FIG. 5, operation of the numerically controlled oscillator 155 needs to be explained to some degree. A principal component of the NCO 155 is a counter 211 whose output is a plurality of bits in line 159. The most significant bit of the counter output is carried by the line 119. It is desired that the frequency of the signal in the line 119 be $3.5f_0$, the nominal intermediate frequency of the L1 carrier that is applied to the digital processing circuitry without any effect of a Doppler frequency shift.

But since the L1 carrier frequency will change somewhat because of the Doppler effect, the counter 211 must be variable enough to be able to track and lock on such frequency variations. The counter 211 in this specific example is chosen to normally count to ten before automatically repeating, thereby normally producing a signal in the line 119 that is 1/10th of the frequency of the clock signal driving the counter 211. The line 161 carries a control signal to the counter 211. When the counter receives a pulse in the line 161, its next cycle counts only to 9 instead of 10, while subsequent cycles count to ten until another pulse is received in the line 161.

The counter shift pulses in the line 161 are developed from a state machine 213 that includes an adder 215 and a plurality of paralleled flip-flops 217. The output of the flip-flops 217 become one of the two inputs of the adder 215, the other input of the adder coming from a control register 219 that is loaded with a word that represents the desired frequency of the NCO 155 output. The most significant bit of the word stored in the flip-flops 217 is passed by line 221 to an edge detecting circuit 223 that outputs a pulse in the line 161 each time the waveform in the line 221 transitions from a zero to a one.

It is helpful in understanding the operation of the circuit of FIG. 5 to consider a specific operational example in conjunction with the waveforms of FIG. 6. FIG. 6(A) shows a waveform in NCO line 221 having a nominal frequency of $0.7f_0$, a result of the circuit 213 being driven by a clock of $2f_0$. That results in a shift pulse in line 161 at each rising edge of that signal, as shown in FIG. 6(B). FIG. 6(D) illustrates that the output of the counter 211 in line 119 will normally have a period of ten cycles of its $34.3f_0$ clock except immediately after receiving a shift pulse. An area 225 in FIG. 6(D) illustrates the difference in the shape of the waveform in line 119 when the counter 211 cycles in nine counts in response to a shift pulse, as shown in a solid line, as opposed to when it is allowed to go its full ten counts, as shown in a dashed line. Because of the frequencies involved in this specific example, the counter 211 needs to divide its clock signal of $34.3f_0$ by 9.8 in order to produce a $3.5f_0$ signal in the line 119 that will keep the phase lock loop 123 of FIG. 3 locked onto the reduced frequency L1 signal, without any Doppler frequency shift. This is accomplished changing the modulo of the divide of the counter 211 to nine once every five cycles of the in-phase clock of line 119, thereby dividing the $34.3f_0$ clock by an average of 9.8 over five cycles.

A measure of the phase of the L1 carrier signal being processed by the circuit of FIG. 5 in a particular processing channel, relative to the phases of the signals being processed by the other channels, is obtained by latching the output 159 of the NCO counter 211 in each channel at the same time. A latch 227 is provided for this purpose and is latched on the declining edge of the one millisecond clock. FIG. 6(C) shows an example of the one millisecond clock and its decreasing edge 229. FIG. 6(D) represents the output of the most significant bit of the counter 211 as a function of time, a reading of all bits at the time indicated at 229 giving a measure of the relative phase of the L1 signal being processed by this channel. Similarly, FIG. 6(E) shows an example of the in-phase clock of another channel that is processing a L1 carrier frequency from a different satellite, its relative phase at the time indicated at 229 being something different, its NCO counter having a different output that is latched. Similarly, FIG. 6(F) shows the in-phase clock of a third digital processing channel where its output indicates another relative phase. These relative phase values are important in being able to calculate the ultimate quantities of distance, velocity and the like.

The accuracy and resolution of such a phase measurement is limited, however, by the frequency of the clock by which the NCO counter 211 is driven. In the specific example being described, that clock, in line 93, is $34.3f_0$, which is 35.0889 MHz. This is approaching the limit of speed of desirable logic families. Although the clock frequency and resolution can be increased by using high speed digital logic (for example, emitter coupled logic), their size and power dissipation make them impractical for use in this application. So the resolution of the phase measured in a manner described above cannot be practically increased by increasing the frequency of the counter clock. Therefore, the phase measuring circuits qf FIG. 5 refine the relative phase stored in the latch 227 by use of circuits 203. In effect, the incremental phase measurement circuits 203 monitor the phase of a number of cycles of the L1 signal carrier replica in the line 119 that occur in a fixed time after the instant 229 when a base phase is measured by storing the count of the counter 211 into the latch 227.

This fine phase measurement is conveniently accomplished in the circuits 203 shown in FIG. 5, wherein an average number of shift pulses occurring in the line 161 is measured during a specified number "A" of $3.43f_0$ clock cycles after the base phase latching instant 229. This average number of shift pulses over many such clock cycles, perhaps hundreds, provides a high resolution incremental phase measurement that, when arithmetically combined with the base phase measurement stored in the latch 227, gives in lines 167 a relative phase measurement for this channel that is extremely accurate and has a very high degree of resolution.

The circuit 203 of FIG. 5 will now be explained with respect to a specific example of its operation given by FIGS. 7 and 8. The $34.3f_0$ clock in line 93 is divided by 10 by a circuit 232. The resulting $3.43f_0$ accumulator clock (FIG. 7(F)) in line 233 drives timing logic circuits 236 which develop timing signals for a counter 231 and an accumulator 237. Operation of the circuit is keyed to the decreasing edge of the 1 msec. clock, such as the edge 229 of FIGS. 6 and 7. The base phase is latched in the latch 227 at the same time as the shift accumulator 237 is enabled. A clear/reset signal (FIG. 7(G)) occurs at a time preceeding the time 229, prior to the beginning of each shift pulse accumulation cycle, and is carried by a line 235 to the counter 231 and to the accumulator 237. Similarly, a line 234 carries an enable signal (FIG. 7(H)) to the accumulator 237. The timing logic circuits 236 cause the enable signal to begin at the time 229 and continue for "A" number of cycles of the accumulator clock in the line 233, this number being four in the example being described, for simplicity, but will typically be 100 or more in practice. The constant "A" is set by a hardware connection or software control through a line 165.

The number of shift pulses in the line 161 is counted by the counter 231 beginning after the counter is reset at time 229. The counter 231 continues to count shift pulses until again reset at the beginning of another cycle. The accumulator 237 is clocked by the accumulator clock (FIG. 7(F)) in the line 233. The accumulator 237 begins at zero at time 229 when reset. At a leading edge of the first cycle of the accumulator clock occuring after time 229, it stores the count of the counter 231. At the next clock leading edge, the accumulator 237 adds the value of the counter at that instant to what is already in the accumulator. This continues for "A" number of $3.43f_0$ accumulator clock cycles, at which time accumulator 237 stops and the its accumulated number is divided by "A" by a circuit 210, the output of which in lines 207 is the incremental phase measure that is then added to the base phase measure stored in the latch 227.

A specific simplified example of the operation of the circuits of FIG. 5 is given in FIGS. 7 and 8 for two receiver channels 1 and 2. That is, the digital processing circuits of FIG. 5 are duplicated in each of the channels 1 and 2 (blocks 23 and 25 of FIG. 1, respectively). FIG. 7(B) shows the L1 signal carrier in line 119 of the channel 1 processing circuits, and FIG. 7(D) the same the channel 2 processing circuits, each channel being locked on a signal from a different satellite. FIG. 7(C) shows an example of two shift pulses being received in the line 161 of the channel 1 processing circuits during "A" number of accumulator clock cycles, and FIG. 7(E) shows a single shift pulse being received during that period by the channel 2 processing circuits.

The Table of FIG. 8(A) illustrates what is being accumulated in each of the two example channels. In the first sample period illustrated in FIG. 7(F), nothing is stored in the accumulator 237 for either channel since no shift pulse occurs during that period in either channel. Their respective counters 231 are thus not incremented during that period. But in the second sample period, a shift pulse (FIG. 7(C)) is received by the counter 231 in channel 1, and at the end of that period is added into the accumulator 237, as indicated by the Table of FIG. 8(A). In sample period number 3, a shift pulse is received by the circuits of channel 2, but none in channel 1, so the counter 231 state in each channel is 1 and this is added to their respective accumulators 237. In sample period number 4, a shift pulse occurs in channel 1, thus incrementing its counter 231 to the value of 2, which number is added to the channel 1 accumulator 237 at the end of the fourth sample period. Since no shift pulse occurs during the fourth sample period in channel 2, its counter 231 retains the count of 1, which is added to its accumulator 237 during that sample period. At the end of four samples, when the accumulator enable signal (FIG. 7(H)) goes low to disable any further operation of the accumulators 237 in all channels, the accumulator of channel 1 contains the number 4, and that of channel 2 the number 2.

Those accumulated shift pulse numbers are then divided by the number of sample periods, in circuits 210 of each channel, to obtain an average. That average for channel 1 is 1.0, and for channel 2 is 0.5. As shown in the Table of FIG. 8(B), those averages are added, by circuits 209 in each channel, to the base phase measurements in those channels, the result being the desired high resolution relative phase measurement. The base phase measurement of this example for channel 1 is the phase of the signal of FIG. 7(B) at time 229, shown to be 4. Similarly, the base phase in channel 2 is given in FIG. 7(D) at time 229, being 5. The phases shown on the signals of FIGS. 7(B) and 7(D) are in hexadecimal form.

Because commercial receivers operating as described with respect to this example actually count a large number of shift pulses over a large number of accumulator clock cycles, the accumulators 237 can be very large. Therefore, it is usually preferred to select an up/down counter for the shift counter 231 in each channel. The shift pulses cause it to count up and some periodically occuring clock signal applied to the counters of each receiver channel cause the counter to count down. That limits the size of the numbers that need to be accumulated, but does so similarly in the processing circuits of each channel, so the relative phases being measured do not change. In the example circuits described herein, such a down counting clock can be obtained by dividing the accumulator clock in line 233 by five.

The circuits of FIG. 5 have been described in detail for the L1 signal processing. Similar circuits operating in a similar way are provided as part of FIG. 4 for processing the L2 signal, with an adjustment of clock frequencies and shift rates being made because of its different carrier frequency.

Although the various aspects of the present invention have been described with respect to a preferred embodiment thereof and a specific working example, it will be understood that the invention is entitled to protection within the full scope of the appended claims.

It is claimed:

1. In a global positioning system receiver having a radio frequency section adapted for receiving from an antenna a L1 radio frequency signal having a nominal carrier frequency of $1540f_0$, where $f_0=1.023$ MHz., and for delivering an intermediate frequency signal to a digital section that processes the intermediate frequency signal in a manner to extract desired phase information therefrom, an improved receiver section, comprising:

a first radio frequency stage connectable to said antenna and having an output, a first mixer receiving said first radio frequency stage output and responsive to a first local oscillator signal for reducing a signal output of the first radio frequency stage to a first intermediate frequency signal, a second radio frequency stage receiving the first intermediate frequency signal and having an output, a second mixer receiving the second radio frequency stage output and responsive to a second local oscillator signal for reducing the first intermediate frequency signal to a second intermediate frequency signal, a third radio frequency stage connecting said second intermediate frequency signal to an input of said digital section, and means responsive to a common precise reference oscillator for generating said first and second local oscillator signals and clock signals for said digital section that are all mutually coherent with each other, said reference oscillator having a frequency of substantially $20f_0$, said first local oscillator signal being substantially $1372f_0$, wherein said first intermediate frequency signal is substantially $168f_0$, and said second local oscillator signal being substantially $171.5f_0$, wherein said second intermediate frequency signal is substantially $3.5f_0$, whereby said digital processing section can be easily process said second intermediate frequency signal.

2. The improved receiver according to claim 1 wherein said second radio frequency stage include a band pass filter.

3. In a global positioning system receiver having a first radio frequency section adapted for connection to an antenna to receive an L1 radio frequency signal and a second radio frequency section adapted for connection to said antenna for receiving an L2 radio frequency signal, said L1 and L2 signals having first and second spaced-apart carrier frequencies, each of the first and second radio frequency sections connected to deliver individual intermediate frequency signals to a digital section for processing said intermediate frequency signals in a manner to measure the phases of each of the L1 and L2 radio frequency signals, the improvement comprising:

said first radio frequency section having a first mixer connected to receive the L1 radio frequency signal, said second radio frequency section having a second mixer connected to receive the L2 radio frequency signal, and local oscillator means connected to each of said first and second oscillators for simultaneously delivering thereto a singular fixed frequency signal intermediate to that of said L1 and L2 radio frequencies, thereby simultaneously developing a first intermediate frequency signal at the output of the first mixer and a second intermediate frequency signal at the output of the second mixer, with a singular, intermediate local oscillator signal.

4. In a global positioning system receiver having a first radio frequency section adapted for connection to an antenna to receive an L1 radio frequency signal and a second radio frequency section adapted for connection to said antenna for receiving an L2 radio frequency signal, said L1 and L2 signals having first and second spaced-apart carrier frequencies, each of the first and second radio frequency sections connected to deliver individual intermediate frequency signals to a digital section for processing said intermediate frequency signals in a manner to measure the phases of each of the L1 and L2 radio frequency signals, the improvement comprising:

said first radio frequency section having a first mixer connected to receive the L1 radio frequency signal, said second radio frequency section having a second mixer connected to receive the L2 radio frequency signal, and local oscillator means connected to each of said first and second oscillators for delivering thereto a fixed frequency signal wherein said frequency is substantially $1372f_0$, wherein $f_0=1.023$ MHz, thereby to develop a first intermediate frequency signal at the output of the first mixer and a second intermediate frequency signal at the output of the second mixer, with a common local oscillator signal.

5. The improved receiver according to claim 4 wherein said first radio frequency section includes a third mixer connected to receive the intermediate frequency signal output of said first mixer.

6. The improved receiver according to claim 5 wherein said local oscillator means generates a second local oscillator signal coherent with said first signal and which is applied to said third mixer, said second local oscillator signal being substantially equal to $171.5f_0$.

7. The improved receiver according to claim 6 wherein said second radio frequency section includes means receiving said intermediate frequency output of said second mixer for autocorrelating said intermediate frequency signal, and a fourth mixer receiving the autocorrelated intermediate frequency signal, said local oscillator means providing a third local oscillator signal to said fourth mixer that is coherent with the first and second local oscillator signals.

8. The improved receiver according to claim 7 wherein said third local oscillator signal is substantially equal to $343F_0$.

9. In a global position electronic receiver having a radio frequency section connected to receive a radio frequency signal from an antenna and deliver an intermediate frequency signal to an input of a digital processor that derives therefrom information of the relative phase of said received radio frequency signal, an improved relative phase measuring portion of said digital processor:

a phase-locked loop circuit connected to receive and lock upon said intermediate frequency signal, said phase lock loop circuit including a multibit counter whose most significant bit is utilized in the phase locked loop, said counter being characterized by shifting its output an amount of phase in response to an input pulse developed as part of said phase locked loop in order to keep said loop locked onto said intermediate frequency signal, counter means connected to the output of said for periodically latching all bits of its output in response to a periodic clock signal, thereby to obtain a base measurement of relative phase of the intermediate frequency signal, means receiving and counter phase shifting pulses for periodically determining the average number of said pulses over a fixed period of time, thereby to provide an incremental phase measurement, and means receiving both the base phase measurement and the incremental phase measurement for summing said measurements, thereby to obtain the relative phase of said received radio frequency signal.

10. A method of determining the relative phase of a plurality of L-band radio frequency signals having unique modulation and originating in a plurality of global positioning system satellites, comprising the steps of:

receiving said plurality of radio frequency signals and reducing them by a common radio frequency down-converting system to a plurality of intermediate frequency signals, digitally identifying each of said plurality of intermediate frequency signals by their unique modulation, simultaneously locking a separate phase locked loop electronic circuit onto each of said plurality of signals, simultaneously determining a base relative phase of each of said plurality of intermediate frequency signals, determining separately for each of said plurality of intermediate signals from a quantity that responds to their relative phase an incremental relative phase having a higher degree of resolution than the base relative phase determinations, and arithmetically combining the base and incremental phase values for each of the intermediate frequency signals, whereby the relative phase of each of the radio frequency signal is determined.

11. A method of determining the relative phase of a plurality of L-band radio frequency signals having unique modulation and originating in a plurality of global positioning system satellites, comprising the steps of:

receiving said plurality of radio frequency signals, mixing said plurality of radio frequency signals with a local oscillator frequency of substantially $1372f_0$, where $f_0 = 1.023$ MHz., thereby to reduce the frequency of the radio frequency signals, mixing said reduced frequency signals with a local oscillator frequency of substantially $171.5f_0$, thereby to obtain a plurality of intermediate frequency signals, digitally identifying each of said plurality of intermediate frequency signals by their unique modulation.

simultaneously locking a separate phase locked loop electronic circuit onto each of said plurality of signals, simultaneously determining a base relative phase of each of said plurality of intermediate frequency signals, determining separately for each of said plurality of intermediate signals from a quantity that responds to their relative phase an incremental relative phase having a higher degree of resolution than the base relative phase determinations, and arithmetically combining the base and incremental phase values for each of the intermediate frequency signals, whereby the relative phase of each of the radio frequency signals is determined.

12. In the global position electronic receiver having a radio frequency section connected to receive a radio frequency signal from an antenna and deliver an intermediate frequency signal to an input of a digital processor that derives therefrom information of the relative phase of said received radio frequency signal, an improved relative phase measuring portion of said digital processor comprising:

means for generating a clock signal of a given period;

means responsive to said clock generating means for determining a base measurement of the relative phase of said intermediate frequency signal to an accuracy of the period of said clock signal;

means responsive to said base measurement means and said clock means for determining an incremental phase measurement over a series of clock periods with an accuracy that is better than that of said base measurement; and means responsive to said base and incremental phase measurement means for summing said base and incremental phases, thereby deriving a very accurate relative phase measurement.

13. The improved digital processor of claim 12 additionally comprising:

a phase locked loop circuit connected to receive and lock upon said intermediate frequency signal, and means for transferring the signal of said phase locked loop to the base measurement means.

14. The improved digital processor of claim 13 wherein said phase locked loop includes means for locking onto said intermediate frequency signal, generating its own in-phase signal, and transferring this signal to said base phase measurement means, thereby significantly reducing the signal to noise ratio in the relative phase measurement means and creating a more accurate relative phase measurement.

15. The relative phase measurement means of claim 12 wherein the clock means has a frequency of substantially $34.3F_0$.

* * * * *

UNITED STATES PATENT AND TRADEMARK OFFICE
CERTIFICATE OF CORRECTION

PATENT NO.   : 4,928,106
DATED        : MAY 22, 1990
INVENTOR(S)  : JAVAD ASHJAEE et al

It is certified that error appears in the above-identified patent and that said Letters Patent is hereby corrected as shown below:

Column 13, line 36, in Claim 1:   delete the word "be"

Column 14, line 66, in Claim 9:   insert --counter--
                                  after the word said Column 15, line 3,  in Claim 9:   replace "and"
                                  with --said--

Column 15, line 38, in Claim 10:  replace "signal"
                                  with --signals--

Column 15, line 55, in Claim 11:  replace ... "."
                                  with    ... --,--

Signed and Sealed this

Thirteenth Day of August, 1991

Attest:

HARRY F. MANBECK, JR.

*Attesting Officer*     *Commissioner of Patents and Trademarks*